US012786672B2

(12) United States Patent
Mahalank et al.

(10) Patent No.: US 12,786,672 B2
(45) Date of Patent: Nov. 3, 2026

(54) METHODS, SYSTEMS, AND COMPUTER READABLE MEDIA FOR USING SECURITY EDGE PROTECTION PROXY (SEPP) TO IMPLEMENT MOBILE TERMINATED (MT) SHORT MESSAGE SERVICE (SMS) MESSAGING FOR OUTBOUND ROAMING SUBSCRIBERS

(71) Applicant: Oracle International Corporation, Redwood Shores, CA (US)

(72) Inventors: Shashikiran Bhalachandra Mahalank, Bangalore (IN); Virendra Singh, Bangalore (IN); Jay Rajput, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 293 days.

(21) Appl. No.: 18/786,124

(22) Filed: Jul. 26, 2024

(65) Prior Publication Data

US 2026/0032409 A1 Jan. 29, 2026

(51) Int. Cl.
*H04W 4/14* (2009.01)
*H04M 15/00* (2024.01)
(Continued)

(52) U.S. Cl.
CPC ............. *H04W 4/14* (2013.01); *H04M 15/58* (2013.01); *H04W 8/06* (2013.01); *H04W 8/082* (2013.01); *H04W 12/08* (2013.01); *H04W 84/042* (2013.01)

(58) Field of Classification Search
CPC ......... H04W 4/14; H04W 8/06; H04W 8/082; H04W 12/08; H04M 15/58
See application file for complete search history.

(56) References Cited

U.S. PATENT DOCUMENTS 5,579,371 A 11/1996 Aridas et al.
5,724,658 A 3/1998 Hasan
(Continued)

FOREIGN PATENT DOCUMENTS

CN 1223774 A 7/1999
CN 200980138920.7 5/2016
(Continued)

OTHER PUBLICATIONS

"3rd Generation Partnership Project; Technical Specification Group Core Network and Terminals; 5G System: Technical realization of Service Based Short Message Service; Stage 2 (Release 18)", 3GPP TS 23.540, V18.4.0 (Jun. 2024).

(Continued)

*Primary Examiner* — Justin Y Lee
(74) *Attorney, Agent, or Firm* — Jenkins, Taylor & Hunt, P.A.

(57) ABSTRACT

A method for using a security edge protection proxy (SEPP) for providing mobile terminated (MT) short message service (SMS) to outbound roaming subscribers includes receiving, by a SEPP, a message generated for a UE roaming in a visited public land mobile network (PLMN). The method further includes initiating, by the SEPP, MT SMS delivery to the UE, where initiating the MT SMS delivery includes: obtaining, by the SEPP, an identifier of a short message service function (SMSF) serving the UE for delivering mobile terminated SMS messages to the UE; and transmitting, by the SEPP, a mobile terminated SMS message to the SMSF for delivery to the UE.

20 Claims, 6 Drawing Sheets

(51) Int. Cl.

| | |
|---|---|
| ***H04W 8/06*** | (2009.01) |
| ***H04W 8/08*** | (2009.01) |
| ***H04W 12/08*** | (2021.01) |
| ***H04W 84/04*** | (2009.01) |

(56) References Cited

U.S. PATENT DOCUMENTS 5,805,689 A 9/1998 Neville
5,905,952 A 5/1999 Joensuu et al.
5,915,222 A 6/1999 Olsson et al.
6,006,098 A 12/1999 Rathnasabapathy et al.
6,047,327 A 4/2000 Tso et al.
6,052,591 A 4/2000 Bhatia
6,091,958 A 7/2000 Bergkvist et al.
6,091,959 A 7/2000 Souissi et al.
6,097,960 A 8/2000 Rathnasabapathy et al.
6,101,387 A 8/2000 Granberg et al.
6,119,014 A 9/2000 Alperovich et al.
6,122,510 A 9/2000 Granberg
H1895 H 10/2000 Hoffpauir et al.
6,134,438 A 10/2000 Sawyer
6,144,663 A 11/2000 Hallenstal
6,151,505 A 11/2000 Larkins et al.
6,175,743 B1 1/2001 Alperovich et al.
6,198,923 B1 3/2001 Buettner
6,198,933 B1 3/2001 Lundin
6,219,551 B1 4/2001 Hentiläet al.
6,324,399 B1 11/2001 Salmivalli
6,327,350 B1 12/2001 Spangler et al.
6,381,456 B1 4/2002 Ko
6,381,465 B1 4/2002 Chern et al.
6,400,943 B1 6/2002 Montoya
6,411,632 B2 6/2002 Lindgren et al.
6,456,845 B1 9/2002 Drum et al.
6,505,046 B1 1/2003 Baker
6,505,050 B1 1/2003 Brudos et al.
6,563,917 B2 5/2003 Sabinson et al.
6,567,658 B1 5/2003 Van De Graaf
6,574,481 B1 6/2003 Rathnasabapathy et al.
6,578,085 B1 6/2003 Khalil et al.
6,611,687 B1 8/2003 Clark et al.
6,622,016 B1 9/2003 Sladek et al.
6,650,902 B1 11/2003 Richton
6,662,017 B2 12/2003 McCann et al.
6,735,441 B1 5/2004 Turgeon et al.
6,738,362 B1 5/2004 Xu et al.
6,915,325 B1 7/2005 Lee et al.
6,952,582 B2 10/2005 Murai
6,959,076 B2 10/2005 Chang et al.
6,990,347 B2 1/2006 McCann
7,113,781 B1 9/2006 Allison et al.
7,222,192 B2 5/2007 Allison et al.
7,302,052 B2 11/2007 Fleischer, III et al.
7,961,622 B2 6/2011 Russell et al.
8,213,899 B1 7/2012 Kindred et al.
8,478,828 B2 7/2013 Craig et al.
8,498,202 B2 7/2013 Kanode et al.
8,527,598 B2 9/2013 Craig et al.
8,613,073 B2 12/2013 McCann et al.
8,626,156 B2 1/2014 Marsico
8,644,324 B2 2/2014 Kanode et al.
8,644,355 B2 2/2014 Agarwal et al.
8,750,126 B2 6/2014 McCann et al.
8,761,764 B2 6/2014 McCann et al.
8,792,329 B2 7/2014 Kanode et al.
8,812,020 B2 8/2014 Marsico
8,874,784 B2 10/2014 Agarwal et al.
9,363,388 B2 6/2016 Russell
9,998,419 B2 6/2018 Agarwal et al.
12,501,253 B2 * 12/2025 Colom Ikuno ......... H04W 8/12
2002/0025821 A1 2/2002 Clapton et al.
2002/0026527 A1 2/2002 Das et al.
2002/0037750 A1 3/2002 Hussain et al.
2002/0050927 A1 5/2002 De Moerloose et al.
2002/0057780 A1 5/2002 Gruchala et al.
2002/0061003 A1 5/2002 Sumner et al.
2002/0065086 A1 5/2002 Vanttinen et al.
2003/0095555 A1 5/2003 McNamara et al.
2003/0119492 A1 6/2003 Timmins et al.
2003/0129991 A1 7/2003 Allison et al.
2003/0161457 A1 8/2003 Sabinson et al.
2004/0132449 A1 7/2004 Kowarsch
2004/0203756 A1 10/2004 Lin et al.
2005/0043036 A1 2/2005 Loppe et al.
2005/0090225 A1 4/2005 Muehleisen et al.
2005/0220288 A1 10/2005 Huey
2007/0032247 A1 2/2007 Shaffer et al.
2007/0094142 A1 4/2007 Russell et al.
2007/0293187 A1 12/2007 Pennock
2008/0233935 A1 9/2008 Garg
2008/0273679 A1 11/2008 Russell et al.
2008/0280605 A1 11/2008 Ophir et al.
2009/0075635 A1 3/2009 Russell et al.
2009/0177484 A1 7/2009 Davis et al.
2009/0227276 A1 9/2009 Agarwal et al.
2010/0029272 A1 2/2010 McCann et al.
2010/0035640 A1 2/2010 Lew et al.
2010/0094703 A1 4/2010 Bramley et al.
2010/0178896 A1 7/2010 Terrero Diaz-Chirón et al.
2010/0192170 A1 7/2010 Raleigh
2010/0250685 A1 9/2010 Kunz et al.
2011/0038287 A1 2/2011 Agarwal et al.
2011/0116382 A1 5/2011 McCann et al.
2011/0249595 A1 10/2011 Rozov
2012/0191847 A1 7/2012 Nas et al.
2012/0311064 A1 12/2012 Deo
2014/0031029 A1 1/2014 Rajagopalan et al.
2014/0233430 A1 8/2014 Russell
2015/0089003 A1 3/2015 Agarwal et al.
2022/0225075 A1 * 7/2022 Shao ....................... H04W 8/08

FOREIGN PATENT DOCUMENTS

DE 198 05 261 A1 8/1999
EP 0 710 043 A1 5/1996
EP 1 472 809 B1 3/2011
EP 2 311 284 B1 11/2017
WO WO 99/40748 8/1999
WO WO 00/74409 A1 12/2000
WO WO 01/67782 A2 9/2001
WO WO 03/061159 A1 7/2003
WO WO 2008/148421 A1 12/2008
WO WO 2010/014999 A2 2/2010

OTHER PUBLICATIONS

Notice of Allowance and Fee(s) Due for U.S. Appl. No. 14/500,962 (Jan. 17, 2018).
Decision to grant a European patent pursuant to Article 97(1) EPC for European Patent Application No. 09803708.8 (Oct. 19, 2017).
First Examination Report for Indian Patent Application No. 1321/CHENP/2011 (Jun. 20, 2017).
Communication under Rule 71(3) EPC for European Patent Application No. 09 803 708.8 (Jun. 16, 2017).
Communication pursuant to Article 94(3) EPC for European Patent Application No. 09 803 708.8 (Mar. 27, 2017).
Examiner's Answer for U.S. Appl. No. 14/500,962 (Oct. 20, 2016).
Letter regarding Notice to Grant for Chinese Patent Application No. 200980138920.7 (Mar. 31, 2016).
Notice of Allowance and Fee(s) Due for U.S. Appl. No. 14/182,722 (Feb. 9, 2016).
Notification of the Third Office Action for Chinese Patent Application No. 200980138920.7 (Dec. 21, 2015).
Final Office Action for U.S. Appl. No. 14/500,962 (Nov. 23, 2015).
Final Office Action for U.S. Appl. No. 14/182,722 (Oct. 29, 2015).
Non-Final Office Action for U.S. Appl. No. 14/182,722, (Jul. 15, 2015).
Non-Final Office Action for U.S. Appl. No. 14/500,962 (Jun. 16, 2015).
Notice of Allowance and Fee(s) Due for U.S. Appl. No. 14/182,722 (Oct. 29, 2014).

(56) References Cited

OTHER PUBLICATIONS

Commonly-Assigned, co-pending U.S. Appl. No. 14/500,962 for "Systems, Methods, and Computer Readable Media for Controlling Social Networking Service Originated Message Traffic," (Unpublished, filed Sep. 29. 2014).
Notice of Allowance and Fee(s) Due for U.S. Appl. No. 12/853,901 (Jun. 25, 2014).
Rejection Decision for Chinese Application No. 200980138920.7 (May 23, 2014).
Applicant-Initiated Interview Summary for U.S. Appl. No. 12/853,901 (May 13, 2014).
Non-Final Office Action for U.S. Appl. No. 14/182,722 (May 13, 2014).
Notice of Allowance and Fee(s) Due for U.S. Appl. No. 12/534,766 (Mar. 17, 2014).
Commonly-Assigned, Co-Pending U.S. Appl. No. 14/182,722 titled "Methods, Systems, and Computer Readable Media for Providing Targeted Services to Telecommunications Network Subscribers Based on Information Extracted from Network Signaling and Data Traffic)," (unpublished, filed Feb. 18, 2014).
Non-Final Office Action for U.S. Appl. No. 12/853,901 (Feb. 7, 2014).
Advisory Action Before the Filing of an Appeal Brief for U.S. Appl. No. 12/853,901 (Dec. 30, 2013).
Final Office Action for U.S. Appl. No. 12/853,901 (Oct. 15, 2013).
Extended European Search Report for European Application No. 09803708.8 (Oct. 11, 2013).
Applicant-Initiated Interview Summary for U.S. Appl. No. 12/853,901 (Sep. 6, 2013).
Non-Final Office Action for U.S. Appl. No. 12/534,766 (Aug. 5, 2013).
Non-Final Office Action for U.S. Appl. No. 12/853,901 (Apr. 29, 2013).
First Office Action for Chinese Application No. 200980138920.7 (Apr. 24, 2013).
Notice of Panel Decision from Pre-Appeal Brief Review for U.S. Appl. No. 12/534,766 (Apr. 17, 2013).
Restriction and/or Election Requirement for U.S. Appl. No. 12/853,901 (Jan. 22, 2013).
Final Official Action for U.S. Appl. No. 12/534,766 (Oct. 23, 2012).
Non-Final Official Action for U.S. Appl. No. 12/534,766 (Mar. 29, 2012).
Communication regarding the expiry of the time limit within which notice of opposition may be filed for European Application No. 02786968.4 (Feb. 3, 2012).
Communication of European publication number and information on the application of Article 67(3) EPC for European Application No. 09803708.8 (Mar. 23, 2011).
Communication under Rule 71(3) EPC for European Application No. 02786968.4 (Oct. 26, 2010).
Notification of Transmittal of the International Search Report and the Written Opinion of the International Searching Authority, or the Declaration for International Application No. PCT/US2009/052604 (Apr. 12, 2010).
Decision to refuse a European Patent application for European Application No. 01922340.3 (Feb. 11, 2009).
Provision of a copy of the minutes in accordance with Rule 124(4) EPC for European Application No. 01922340.3 (Feb. 11, 2009).
Communication pursuant to Article 94(3) EPC for European Application No. 02786968.4 (Sep. 29, 2008).
Summons to attend oral proceedings pursuant to Rule 115(1) EPC for European Application No. 01922340.3 (Jul. 22, 2008).
Supplementary European Search Report for European Application No. 02786968.4 (May 15, 2008).
Communication pursuant to Article 96(2) EPC for European Application No. 01922340.3 (Oct. 23, 2007).
Notice of Allowance and Fee(s) Due for U.S. Appl. No. 10/044,203 (Mar. 13, 2007).
Final Official Action for U.S. Appl. No. 10/044,203 (Aug. 8, 2006).
Notice of Allowance and Fee(s) Due for U.S. Appl. No. 09/649,461 (Jul. 31, 2006).
Decision on Appeal for U.S. Appl. No. 09/649,461 (Jul. 13, 2006).
Examiner's Answer for U.S. Appl. No. 09/649,461 (Feb. 17, 2006).
Non-Final Official Action for U.S. Appl. No. 10/044,203 (Jan. 10, 2006).
Order Returning Undocketed Appeal to Examiner for U.S. Appl. No. 09/649,461 (Nov. 7, 2005).
Non-Final Official Action for U.S. Appl. No. 10/044,203 (Apr. 20, 2005).
Examiner's Answer for U.S. Appl. No. 09/649,461 (Apr. 19, 2005).
Opposition in European Patent Application No. 1 308 054 (Dec. 3, 2004).
Advisory Action for U.S. Appl. No. 09/649,461 (Nov. 18, 2004).
Final Official Action for U.S. Appl. No. 09/649,461 (Mar. 30, 2004).
International Preliminary Examination Report for International Application No. PCT/US01/07828 (Oct. 8, 2003).
Non-Final Official Action for U.S. Appl. No. 09/649,461 (Jul. 28, 2003).
Final Official Action for U.S. Appl. No. 09/649,461 (Apr. 11, 2003).
Notification of Transmittal of the International Search Report or the Declaration for International Application No. PCT/US02/39265 (Feb. 14, 2003).
Notification of European Publication Number and Information on the Application of Article 67(3) EPC for European Application No. 01922340.3 (Nov. 6, 2002).
Non-Final Official Action for U.S. Appl. No. 09/649,461 (Oct. 18, 2002).
Sprague, "Tekelec's Transport Adapter Layer Interface," RFC 3094, pp. 1-106 (Apr. 2001).
"Universal Mobile Telecommunications System (UMTS); Super-Charger Technical Realization; Stage 2", ETSI TS 123 116, V4.0.0 (Mar. 2001). pp. 1-29 (Mar. 2001).
Stewart et al., "Stream Control Transmission Protocol," RFC 2960, pp. 1-134 (Oct. 2000).
"Digital cellular telecommunications system (Phase 2+); Mobile Application Part (MAP) specification (3GPP TS 09.02 version 7,6.0 Release 1998)," ETSI TS 100 974 V7.6.0 (Sep. 2000). (Part 1 of 4, pp. 1-285).
"Digital cellular telecommunications system (Phase 2+); Mobile Application Part (MAP) specification (3GPP TS 09.02 version 7.6.0 Release 1998)," ETSI TS 100 974 V7.6.0 (Sep. 2000). (Part 2 of 4, pp. 286-571).
"Digital cellular telecommunications system (Phase 2+); Mobile Application Part (MAP) specification (3GPP TS 09.02 version 7.6.0 Release 1998)," ETSI TS 100 974 V7.6.0 (Sep. 2000). (Part 3 of 4, pp. 571-857).
"Digital cellular telecommunications system (Phase 2+); Mobile Application Part (MAP) specification (3GPP TS 09.02 version 7.6.0 Release 1998)," ETSI TS 100 974 V7.6.0 (Sep. 2000). (Part 4 of 4, pp. 858-1145).
"3rd Generation Partnership Project; Technical Specification Group Core Network; Gateway Location Register (GLR)—Stage 2 (Release 1999)," 3G TS 23.119 V3.0.0, pp. 1-129 (Mar. 2000).
"Universal Mobile Telecommunications System (UMTS); Super-charger; Stage 2 (3G TS 23.116 version 3.0.0 Release 1999)," ETSI TS 123 116 V3.0.0 (Mar. 2000).
"Digital Cellular Telecommunications System (Phase 2+); Technical Realization of the Short Message Service (SMS); (GSM 03.40 version 7.4.0 Release 1998)," ETSI TS 100 901, V7.4.0 (Dec. 1999).
Digital Cellular Telecommunications System (Phase 2+); Location Registration Procedures, (GSM 03.12 version 7.0.0 Release 1998), ETSI TS 100 530, V7.0.0 (Aug. 1999).
Bertrand, "Jambala Mobility Gateway-Convergence and Inter-System Roaming," Ericsson Review, No. 2, pp. 89-93 (1999).
Urs, "Roaming Notification and Local Service Control Through Short Message Service," Motorola Technical Developments, vol. 34, pp. 17-19 (Mar. 1, 1998).
A30808-X3245-X32-1-7618 (Information, Network Element, Home Location Register Authentication Center, Siemens 1998).
"IP7 Secure Gateway," Release 1.0, Tekelec, Release Documentation 910-2046-01 Revision A (Nov. 1999).

(56) References Cited

OTHER PUBLICATIONS

"Feature Guide Eagle STP," Tekelec, P/N 910-1225-01, Revision B (Jan. 1998).
Yamaguchi et al., "Inter-system mobility and service management in GSM/PDC roaming," IEEE, pp. 694-698 (Nov. 1997).
"Digital Cellular Telecommunications System (Phase 2+); Mobile Application Part (MAP) Specification (GSM 09.02)," ETS 300 974 (May 1997).
A30808-X2769-X7-3-7618 (Information, Signaling, Overview CCNC, Siemens AG 1997).
Eagle Feature Guide, P/N 910-1225-01, Revision A, Tekelec, Mar. 1996.
A30808-X3245-X17-1-7618 (Information, Network Element, Mobile-Service Switching Center, Visitor Location Register, Siemens AG 1996).
A30808-X3245-X19-1-7618 (Information, Network Element, Equipment Identity Register, Siemens AG 1995).
A30808-X3245-X18-1-7618 (Information, Network Element, Home Location Register, Authentication Center, Siemens AG 1995).
A30808-X2769-X6-1-7618 (Information, Signaling, Overview CCNC, Siemens AG 1995).
Chatras et al., "Mobile Application Part Design Principles," International Switching Symposium, pp. 1-9 (1990).
"3rd Generation Partnership Project; Technical Specification Group Services and System Aspects; Procedures for the 5G System (5GS); Stage 2 (Release 19)", 3GPP TS 23.502, V19.0.0 (Jun. 2024).
"3rd Generation Partnership Project; Technical Specification Group Core Network and Terminals; 5G System; Network Function Repository Services; Stage 3 (Release 18)", 3GPP TS 29.510, V18.7.0 (Jun. 2024).
"3rd Generation Partnership Project; Technical Specification Group Services and System Aspects; Security architecture and procedures for 5G system (Release 18)", 3GPP TS 33.501, V18.5.0, pp. 1-330 (Mar. 2024).

* cited by examiner

METHODS, SYSTEMS, AND COMPUTER READABLE MEDIA FOR USING SECURITY EDGE PROTECTION PROXY (SEPP) TO IMPLEMENT MOBILE TERMINATED (MT) SHORT MESSAGE SERVICE (SMS) MESSAGING FOR OUTBOUND ROAMING SUBSCRIBERS

TECHNICAL FIELD

The subject matter described herein relates to providing SMS service. More particularly, the subject matter described herein relates to methods, systems, and computer readable media for using the SEPP to implement MT SMS messaging for outbound roaming subscribers.

BACKGROUND

In 5G telecommunications networks, a network function that provides service is referred to as a producer network function (NF) or NF service producer. A network function that consumes services is referred to as a consumer NF or NF service consumer. A network function can be a producer NF, a consumer NF, or both, depending on whether the network function is consuming, producing, or consuming and producing services. The terms "producer NF" and "NF service producer" are used interchangeably herein. Similarly, the terms "consumer NF" and "NF service consumer" are used interchangeably herein.

A given producer NF may have many service endpoints, where a service endpoint is the point of contact for one or more NF instances hosted by the producer NF. The service endpoint is identified by a combination of Internet protocol (IP) address and port number or a fully qualified domain name (FQDN) that resolves to an IP address and port number on a network node that hosts a producer NF. An NF instance is an instance of a producer NF that provides one or more services. A given producer NF may include more than one NF instance. It should also be noted that multiple NF instances can share the same service endpoint.

NFs register with an NF repository function (NRF). The NRF maintains profiles of available NF instances identifying the services supported by each NF instance. The profile of an NF instance is referred to in 3GPP TS 29.510 as an NF profile. NF instances can obtain information about other NF instances that have registered with the NRF through the NF discovery service operation. According to the NF discovery service operation, a consumer NF sends an NF discovery request to the NRF. The NF discovery request includes query parameters that the NRF uses to locate the NF profiles of producer NFs capable of providing the service identified by the query parameters. NF profiles are data structures that define the types of services provided by an NF instance as well as contact and capacity information regarding the NF instance.

SCPs route messages between producer NF instances. An SCP can also invoke the NF discovery service operation to learn about available producer NF instances. The case where the SCP uses the NF discovery service operation to obtain information about producer NF instances on behalf of consumer NFs is referred to as delegated discovery. Consumer NFs connect to the SCP, and the SCP load balances traffic among producer NF service instances that provide the required services or directly routes the traffic to the destination producer NF instance.

One issue that can arise in 5G, previous generation, and subsequent generation networks is efficiently providing SMS-based roaming value added service (RVAS) to outbound roaming subscribers, i.e., subscribers of a service provider's network who are accessing services in a network not controlled by the service provider. For example, a home network operator for a user equipment (UE) may wish to send a mobile terminated SMS message when the UE initially registers with a new network to notify the UE that the UE is roaming in a new PLMN. This type of SMS message is sometimes referred to as a welcome message, because the message welcomes the subscriber to a new PLMN. In another example, the home network operator may wish to send messages to outbound roaming subscribers regarding data usage or containing advertisements.

One conventional method for sending SMS messages to outbound roaming subscribers is to probe the N32 connection between the H-SEPP and the V-SEPP, detect an initial registration message for a roaming subscriber, and trigger the SMS message based on the initial registration message. One problem with a probing solution is that when the SEPPs are operating in transport layer security (TLS) mode, the messages transmitted over the N32 connection between the SEPPs are encrypted by the SEPPs acting as the TLS endpoints and cannot be decrypted without the security information of the TLS endpoints. If the protocol for N32 interconnect security (PRINS) mode is used on the N32 connection, the RVAS provider may have access to the messages transmitted between PLMNs, but the mobile network operators may not expose all of the information elements (IEs) required for MT SMS delivery. Even if the RVAS provider can obtain the necessary IEs to send an SMS message to a roaming subscriber, a network operator may wish to avoid the cost of using an RVAS provider.

Accordingly, in light of these and other difficulties, there exists a need for improved methods, systems, and computer readable media for delivering SMS messages to outbound roaming subscribers.

SUMMARY

A method for using a security edge protection proxy (SEPP) for providing mobile terminated (MT) short message service (SMS) to outbound roaming subscribers includes receiving, by a SEPP, a message generated for a UE roaming in a visited public land mobile network (PLMN). The method further includes initiating, by the SEPP, MT SMS delivery to the UE, where initiating the MT SMS delivery includes obtaining, by the SEPP, an identifier of a short message service function (SMSF) serving the UE for delivering mobile terminated SMS messages to the UE; and transmitting, by the SEPP, a mobile terminated SMS message to the SMSF for delivery to the UE.

According to another aspect of the subject matter described herein, receiving the message includes receiving an Nudm_UECM_Registration message for registering a serving network function (NF) serving the UE in the visited PLMN.

According to another aspect of the subject matter described herein, obtaining an identifier of an SMSF serving the UE includes sending, by the SEPP, an Nudm_UECM_SendRoutingInfoForSM request message to a unified data management function (UDM) in a home network of the UE.

According to another aspect of the subject matter described herein, obtaining the identifier of the SMSF serving the UE includes receiving an Nudm_UECM_SendRouting InfoForSM response message from the UDM and reading the identifier of the SMSF from the Nudm_UECM_SendRoutingInfoForSM response message.

According to another aspect of the subject matter described herein, transmitting the mobile terminated SMS message to the SMSF includes transmitting, by the SEPP, an Nsmsf SMService MtFowardSm message with an SMS payload to the SMSF.

According to another aspect of the subject matter described herein, the SMS payload includes network-operator-specified content.

According to another aspect of the subject matter described herein, the message generated for the UE roaming in the visited PLMN is a message for initially registering the UE with the visited PLMN and the network-operator-specified content comprises a welcome message.

According to another aspect of the subject matter described herein, the network-operator-specified content indicates data usage by the UE.

According to another aspect of the subject matter described herein, the network-operator-specified content comprises an advertisement.

According to another aspect of the subject matter described herein, the SEPP comprises a home SEPP (H-SEPP).

According to another aspect of the subject matter described herein, a system for using a security edge protection proxy (SEPP) for providing mobile terminated (MT) short message service (SMS) to outbound roaming subscribers is provided. The system includes a SEPP including at least one processor and a memory. The system further includes an MT SMS delivery controller implemented by the at least one processor for receiving a message generated for a UE roaming in a visited public land mobile network (PLMN), initiating MT SMS delivery to the UE, where initiating the MT SMS delivery includes: obtaining, by the SEPP, an identifier of a short message service function (SMSF) serving the UE for delivering mobile terminated SMS messages to the UE; and transmitting, by the SEPP, a mobile terminated SMS message to the SMSF for delivery to the UE.

According to another aspect of the subject matter described herein, the message includes an Nudm_UECM_Registration message for registering a serving network function (NF) serving the UE in the visited PLMN.

According to another aspect of the subject matter described herein, the MT SMS delivery controller is configured to obtain the identifier of the SMSF serving the UE by sending an Nudm_UECM_SendRouting InfoForSM request message to a unified data management function (UDM) in a home network of the UE.

According to another aspect of the subject matter described herein, the MT SMS delivery controller is configured to obtain the identifier of the SMSF serving the UE by receiving an Nudm_UECM_SendRoutingInfoForSM response message from the UDM and reading the identifier of the SMSF from the Nudm_UECM_SendRoutingInfoForSM response message.

According to another aspect of the subject matter described herein, the MT SMS delivery controller is configured to transmit the mobile terminated SMS message to the SMSF by transmitting an Nsmsf SMService MtFowardSm message with an SMS payload to the SMSF.

According to another aspect of the subject matter described herein, the SMS payload includes network-operator-specified content.

According to another aspect of the subject matter described herein, the message generated for the UE roaming in the visited PLMN is a message for initially registering the UE with the visited PLMN and the network-operator-specified content comprises a welcome message.

According to another aspect of the subject matter described herein, the network-operator-specified content indicates data usage by the UE or an advertisement.

According to another aspect of the subject matter described herein, a non-transitory computer readable medium having stored thereon executable instructions that when executed by a processor of a computer control the computer to perform steps is provided. The steps include receiving, by a security edge protection proxy (SEPP), a message generated for a UE roaming in a visited public land mobile network (PLMN). The steps further include initiating, by the SEPP, mobile terminated (MT) short message service (SMS) delivery to the UE, where initiating the MT SMS delivery includes obtaining, by the SEPP, an identifier of a short message service function (SMSF) serving the UE for delivering mobile terminated SMS messages to the UE; and transmitting, by the SEPP, a mobile terminated SMS message to the SMSF for delivery to the UE.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Exemplary implementations of the subject matter described herein will now be explained with reference to the accompanying drawings, of which.

DETAILED DESCRIPTION

Figure 1:
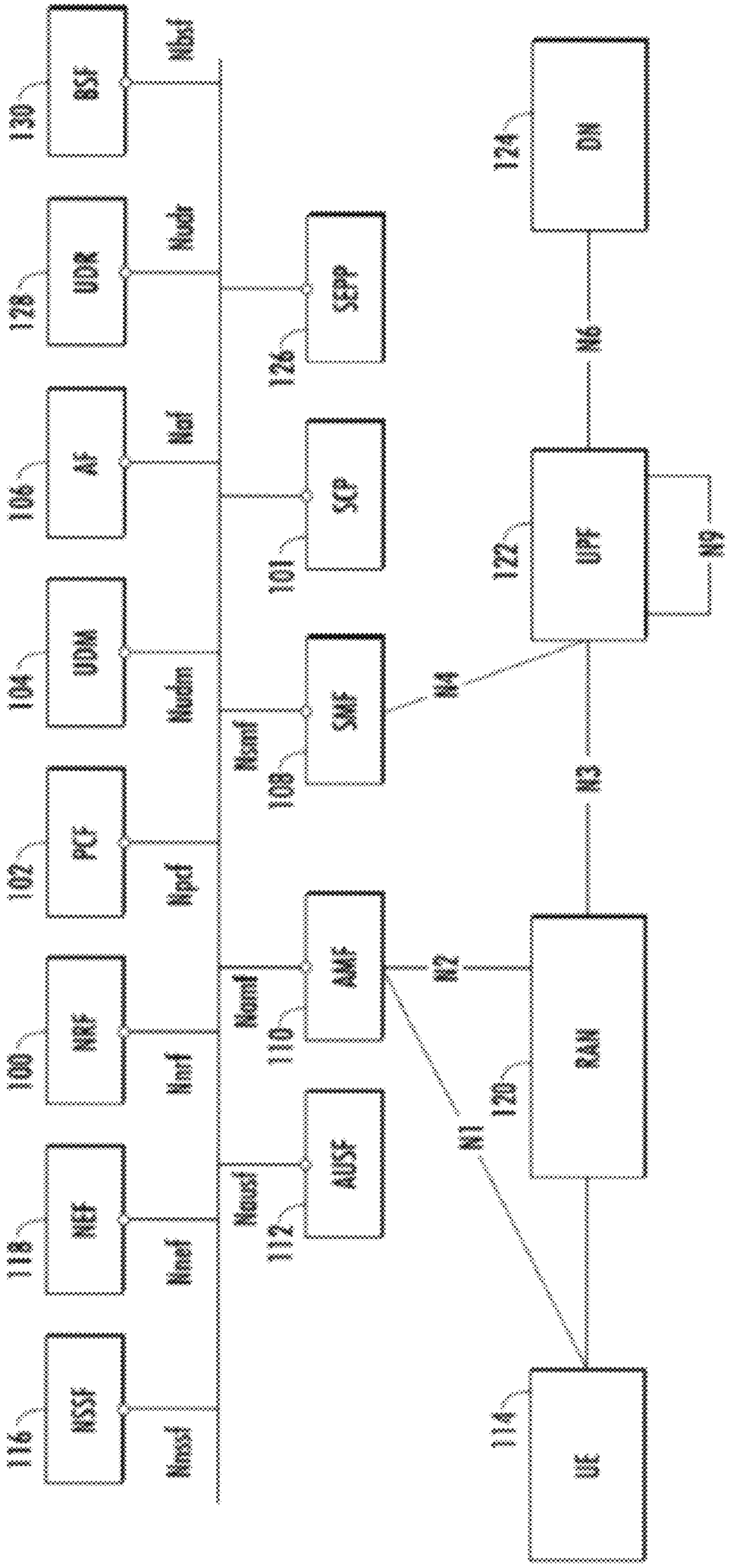
FIG. 1 is a network diagram illustrating an exemplary 5G system network architecture.

FIG. 1 is a network diagram illustrating an exemplary 5G system network architecture. The architecture in FIG. 1 includes NRF 100 and SCP 101, which may be located in the same home public land mobile network (HPLMN). As described above, NRF 100 may maintain profiles of available NF instances and their supported services and allow consumer NFs or SCPs to subscribe to and be notified of the registration of new/updated NF instances. SCP 101 may also support service discovery and selection of NF instances. SCP 101 may perform load balancing of connections between consumer and producer NFs.

NRF 100 is a repository for profiles of NF instances. To communicate with a producer NF instance, a consumer NF or an SCP must obtain the NF profile of the producer NF instance from NRF 100. The NF profile is a JavaScript object notation (JSON) data structure defined in 3GPP TS 29.510. The NF profile includes attributes that indicate the types of services provided, capacity of the NF instance, and information for contacting the NF instance.

In FIG. 1, any of the network functions can be consumer NFs, producer NFs, or both, depending on whether they are requesting, providing, or requesting and providing services. In the illustrated example, the NFs include a policy control function (PCF) 102 that performs policy related operations in a network, a unified data management function (UDM) 104 that manages user data, and an application function (AF) 106 that provides application services.

The NFs illustrated in FIG. 1 further include a session management function (SMF) 108 that manages sessions between an access and mobility management function (AMF) 110 and PCF 102. AMF 110 performs mobility management operations similar to those performed by a mobility management entity (MME) in 4G networks. An authentication server function (AUSF) 112 provides authentication services for user equipment (UEs), such as user equipment (UE) 114, seeking access to the network.

A network slice selection function (NSSF) 116 provides network slicing services for devices seeking to access specific network capabilities and characteristics associated with a network slice. NSSF 116 provides the NSSelection service, which allows NFs to request information about network slices and the NSSAIReachability service, which enables NFs to update and subscribe to receive notification of updates in network slice selection assistance information (NSSAI) reachability information.

A network exposure function (NEF) 118 provides application programming interfaces (APIs) for application functions seeking to obtain information about Internet of things (IoT) devices and other UEs attached to the network. NEF 118 performs similar functions to the service capability exposure function (SCEF) in 4G networks.

A radio access network (RAN) 120 connects user equipment (UE) 114 to the network via a wireless link. Radio access network 120 may be accessed using a gNB (not shown in FIG. 1) or other wireless access point. A user plane function (UPF) 122 can support various proxy functionality for user plane services. One example of such proxy functionality is multipath transmission control protocol (MPTCP) proxy functionality. UPF 122 may also support performance measurement functionality, which may be used by UE 114 to obtain network performance measurements. Also illustrated in FIG. 1 is a data network (DN) 124 through which UEs access data network services, such as Internet services.

A SEPP 126 filters incoming traffic from another PLMN and can perform topology hiding for traffic exiting the home PLMN. SEPP 126 may communicate with a SEPP in a foreign PLMN which manages security for the foreign PLMN. Thus, traffic between NFs in different PLMNs may traverse two SEPP functions, one for the home PLMN and the other for the foreign PLMN. A SEPP filtering egress messages from consumer NFs in a PLMN is referred to as a consumer SEPP or C-SEPP. A SEPP that filters ingress messages directed to producer NFs in a PLMN is referred to as a producer SEPP or P-SEPP. A given SEPP can function as a C-SEPP and a P-SEPP, depending on the role the SEPP is performing.

A unified data repository (UDR) 128 stores subscription data for UEs. A binding support function (BSF) 130 manages bindings between PDU sessions and PCFs.

As stated above, one issue in 5G, previous generation, and subsequent generation networks is efficiently providing SMS value added services to outbound roaming subscribers. One example of an SMS value added service is sending a welcome message to a roaming UE when the UE first registers with a visited network. A welcome message may include information on roaming tariffs/charges, network/service usage, etc.

One traditional method for delivering welcome messages to outbound roaming subscribers relies on probing inter-PLMN control plane traffic implemented at roaming hub (RH)/IP interexchange (IPX) providers to determine the visited SMSF capable of sending SMS messages to the UE. Probing inter-PLMN links for registrations of roaming UEs can be challenging due to the use of encryption for inter-PLMN traffic. The N32 interface between the V-PLMN and H-PLMN provides two modes of inter-PLMN SBI communication. One mode is the TLS mode, where the traffic transmitted over the TLS connection is encrypted by the endpoints. As a result, roaming hub/IPX providers cannot intercept end-to-end TLS-encrypted traffic between the V-PLMN SEPP and the H-PLMN SEPP.

The second mode of inter-PLMN communication between SEPPs is the PRINS mode where the IPX providers have access to the security parameters and can access encrypted traffic. However, even when using the PRINS mode, the H-PLMN may not expose all of the required IEs of N32-f service-based interface (SBI) messages required to implement probe-based welcome SMS RVAS. Hence, the probe-based solution at RH/IPX providers may not work for RVAS implementations that use TLS or PRINS. There is also a cost incurred by mobile network operators (MNOs) associated with a welcome RVAS implementation at RH/IPX providers. Moreover, the H-PLMN MNO does not have control of RVAS application behavior at roaming hub/IPX providers.

Figure 2:
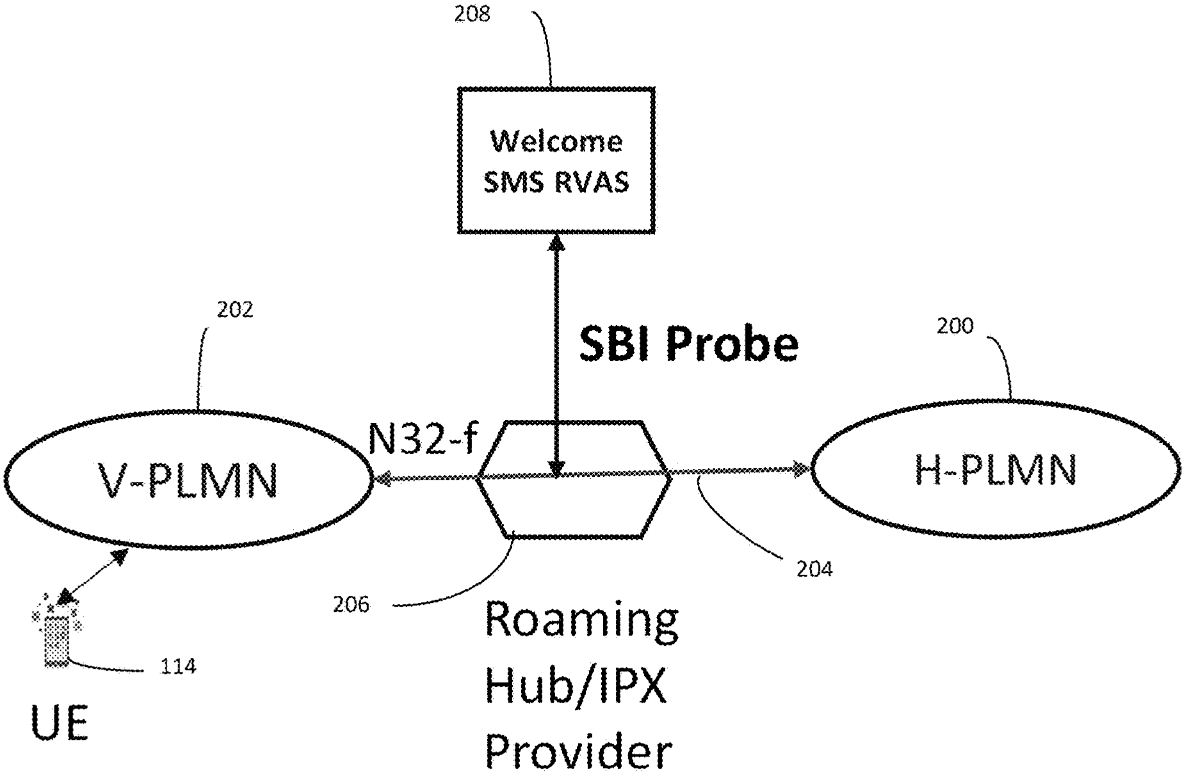
FIG. 2 is a network diagram illustrating an example where an H-PLMN and a V-PLMN are connected via an N32-f connection that spans a roaming hub provider, and a welcome SMS RVAS provider probes communications on an N32-f connection to detect when a UE is roaming in the V-PLMN.

FIG. 2 illustrates an example where an H-PLMN 200 and a V-PLMN 202 are connected via an N32-f connection 204 that spans a roaming hub provider 206. A welcome SMS RVAS provider 208 probes communications on N32-f connection 204 to detect when a UE 114 is roaming in V-PLMN 202. When welcome SMS RVAS provider 208 detects that UE 114 is roaming in V-PLMN 202, welcome SMS RVAS provider 208 may generate and send a welcome SMS message to UE 114. However, if communications on N32-f connection 204 are encrypted by the endpoints or lack some of the IEs needed to deliver the SMS message to UE 114, delivery of the welcome SMS message to UE 114 may not be possible.

To address the difficulties associated with the methodology for providing SMS RVAS, the subject matter described herein includes configuring the H-SEPP to implement an automatic MT SMS trigger where the H-SEPP generates an SMS message with a welcome message payload or other network-operator-generated or network-operator-specified payload and forwards the SMS message to a roaming UE. In one example, on completion of outbound roaming UE registration, the H-PLMN SEPP may invoke the Nudm_UECM_SendRoutingInfoForSM service operation to the H-PLMN UDM to get the routing information of the nodes available for MT welcome SMS delivery to a particular UE. The nodes available for MT welcome message delivery to the UE may be the registered serving SMSF instances for all network access types of the UE. The UDM may check the registration/reachability flags to determine the potential target nodes and respond to the H-SEPP by sending an Nudm_UECM_SendRoutingInfoForSM response, which includes the NF instance ID of the serving SMSF in the V-PLMN. The UDM may separately identify, in the response message to the H-SEPP, an SMSF for 3GPP access and an SMSF for non-3GPP access, if both of the SMSFs are currently valid for the UE. By operating in this manner, the H-SEPP is acting as an SMS-GMSC for delivering a welcome MT SMS message to a UE roaming in the V-PLMN.

The H-SEPP may create the welcome SMS message payload to include visited network identification information, such as visited mobile network operator name and visited country name. The welcome SMS message payload may also include a preconfigured message having content specified by the home network operator. The H-SEPP may send the MT welcome SMS message to the serving SMSF of the V-PLMN. If the H-SEPP has more than one SMSF address to use for SMS transport towards the UE, then the H-SEPP may select the SMSF address to use first, based on a network operator local policy. The V-PLMN SMSF may deliver the MT SMS message to the UE via an AMF over the non-access stratum (NAS), as described in Section 4.13.3.6 of 3GPP TS 23.502. The SMSF sends a delivery report to the H-SEPP in an NsmsfSMService_MtForwardSm response message.

Figure 3:
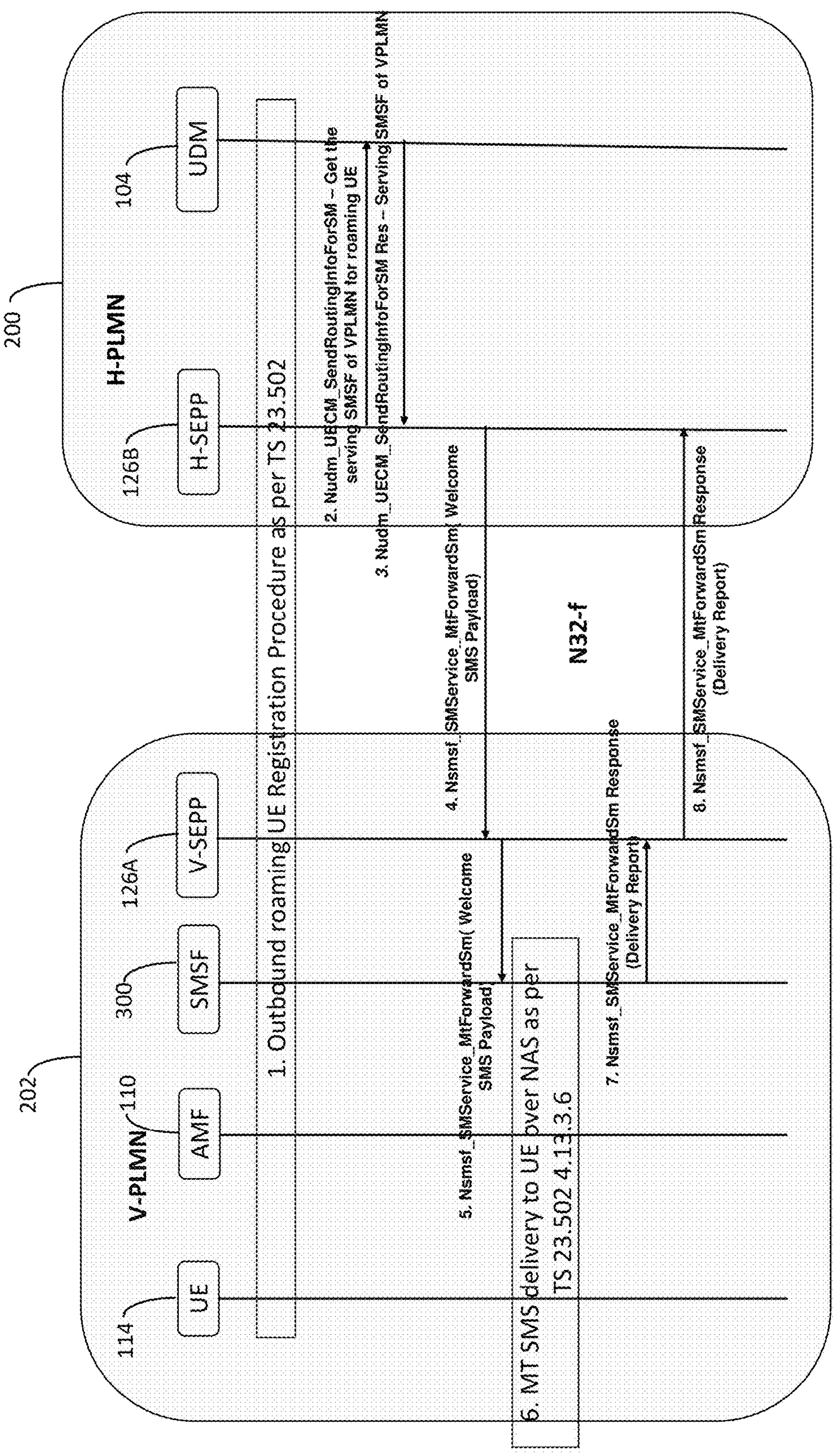
FIG. 3 is a network diagram illustrating an example where the H-SEPP monitors inter-PLMN communications to detect signaling messages concerning roaming subscribers and generates and sends SMS messages to UEs associated with the roaming subscribers.

FIG. 3 is a network diagram illustrating an example where the H-SEPP monitors inter-PLMN communications to detect signaling messages concerning roaming subscribers and generates and sends SMS messages to UEs associated with the roaming subscribers. Referring to FIG. 3, in step 1, UE 114 roams into V-PLMN 202 and initiates the outbound roaming UE registration procedure as defined in 3GPP TS 23.502. The outbound roaming UE registration procedure involves AMF 110 sending an Nudm_UECM_Registration request message to UDM 104. Home SEPP 126B would normally simply forward this message to UDM 104. However, according to an aspect of the subject matter described herein, H-SEPP 126B receives the Nudm_UECM_Registration request message, determines that the registration request message is an initial registration for a roaming UE, and, in response, initiates the process for delivering an SMS welcome message to UE 114.

The process of delivering an SMS welcome message continues with step 2, where H-SEPP 126B seeks to determine the identity of the SMSF capable of delivering SMS messages to UE 114 by sending an Nudm_UECM_SendRoutingInfoForSM request message to UDM 104. UDM 104 receives the Nudm_UECM_SendRoutingInfoForSM request message, determines the identities of one or more SMSFs capable of delivering SMS messages to UE 114, and, in step 3, generates and sends an Nudm_UECM_SendRoutingInfoForSM response message, including the identities of the SMSFs.

H-SEPP 126B receives the Nudm_UECM_SendRoutingInfoForSM response message, reads the identifiers of the SMSFs from the message, and selects one of the SMSFs for delivering SMS content to the UE. In step 4, H-SEPP 126B generates and sends an Nsmsf SMService MTForwardSm request message to selected SMSF 300. In this example, the Nsmsf SMService MTForwardSm request message includes the welcome message content generated by H-SEPP 126B based on network operator configuration. V-SEpp 1126A receives the Nsmsf SMService MTForwardSm request message, and, in step 5, forwards the message to SMSF 300. In step 6, SMSF 300 attempts to deliver the welcome message to UE 114 over the NAS using the procedure described in Section 4.13.3.6 of 3GPP TS 23.502.

In step 7, SMSF 300 generates and sends an Nsmsf SMService MtForwardSm response message to V-SEPP 126A. The Nsmsf SMService MtForwardSm response message carries a delivery report indicating whether delivery of the SMS message to UE 114 was successful. In step 8, SMSF 300 forwards the Nsmsf SMService MtForwardSm response message to H-SEPP 126B. In this example, it is assumed that the delivery of the SMS message was successful, and the process for using H-SEPP 126B to deliver the welcome SMS message to UE 114 ends.

Figure 4:
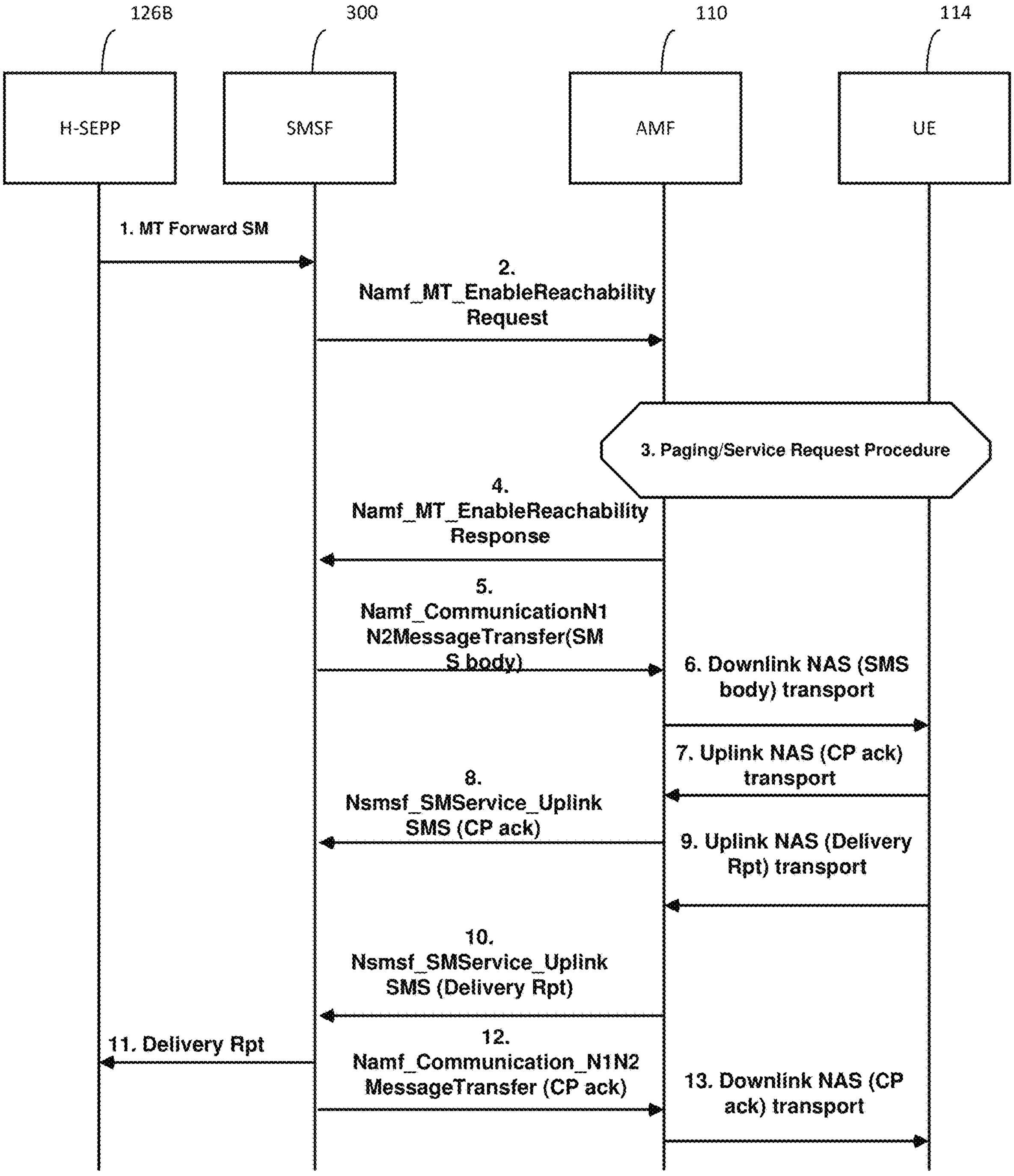
FIG. 4 is a diagram illustrating SMS delivery over the non-access stratum as per the procedures set forth in Section 4.13.3.6 of 3GPP TS 23.502, except, rather than having the SMS-gateway mobile switching center (GMSC) initiate the delivery of the SMS message, the H-SEPP initiates the delivery of the SMS message.

FIG. 4 is a diagram illustrating SMS delivery over the non-access stratum as per the procedures set forth in Section 4.13.3.6 of 3GPP TS 23.502, except, rather than having the SMS-GMSC initiate the delivery of the SMS message, H-SEPP 126B initiates the delivery of the SMS message. Referring to FIG. 4, in step 1, H-SEPP 126B sends a forward MT SM message to SMSF 300. In steps 2-4, SMSF 300 checks the SMS management subscription data. If SMS delivery is allowed, SMSF 300 invokes the Namf_MT_EnableUEReachability service operation to AMF 110. AMF 110 pages the UE using the procedure defined in Section 4.2.3.3 of 3GPP TS 23.502. UE 114 responds to the page with the service request procedure.

If AMF 110 indicates to SMSF 300 that UE 114 is not reachable (including the cases that UE 114 applies a power saving enhancement as described in Section 5.31.7 of 3GPP TS 23.501), the procedure of the unsuccessful mobile terminating SMS delivery described in Section 4.13.3.9 of 3GPP TS 23.502 is performed, and the remaining steps in FIG. 4 are skipped. In the case of a power saving enhancement, AMF 110 further stores the information received in the Namf_MT_EnableUEReachability request and pages UE 114 when UE 114 is considered reachable.

If UE 114 provides access to AMF 110 via both 3GPP access and non-3GPP access, AMF 110 determines the access type to transfer the MT-SMS message based on operator local policy.

In steps 5 and 6, SMSF 300 forwards the SMS message to be sent as defined in 3GPP TS 23.040 (i.e., the SMS message consists of CP-DATA/RP-DATA/TPDU/SMS-DELIVER parts) to AMF 110 by invoking the Namf_Communication_N1N2MessageTransfer service operation. AMF 110 transfers the SMS message to UE 114.

In steps 7 and 8, UE 114 acknowledges receipt of the SMS message to SMSF 300. For an uplink unitdata message toward SMSF 300, AMF 110 invokes the Nsmsf_SMService_UplinkSMS service operation to forward the message to SMSF 300. In order to permit SMSF 300 to create an accurate charging record, AMF 110 also includes the international mobile equipment identifier software version (IMEISV), the current UE location information (ULI) of UE 114 as defined in Section 5.6.2 of 3GPP TS 23.501, and, if the SMS message is delivered to UE 114 via 3GPP access, the local time zone.

In steps 9 and 10, UE 114 returns a delivery report as defined in 3GPP TS 23.040. The delivery report is encapsulated in a NAS message and sent to AMF 110, and the NAS message is forwarded to SMSF 300 by invoking the Nsmsf_SMService_UplinkSMS service operation.

In steps 12 and 13, SMSF 300 acknowledges receipt of the delivery report to UE 114. SMSF 300 uses the Namf_Communication_N1N2MessageTransfer service operation to send a SMS CP ack message to AMF 110. AMF 110 encapsulates the SMS message via a NAS message and sends the NAS message to UE 114. If SMSF 300 has more than one SMS message to send, SMSF 300 and AMF 110 forward subsequent SMS/SMS ack/delivery reports the same manner as described in step 2-12.

If SMSF 300 knows the SMS CP ack is the last message to be transferred for UE 114, SMSF 300 includes a last message indication in the Namf_Communication_N1N2Message Transfer service operation so that the AMF knows no more SMS data is to be forwarded to UE 114. The behavior of AMF 110 based on the "last message indication" is implementation specific. In parallel to steps 12 and 13, SMSF 300 sends the delivery report to H-SEPP 126B, as indicated by step 11.

Figure 5:
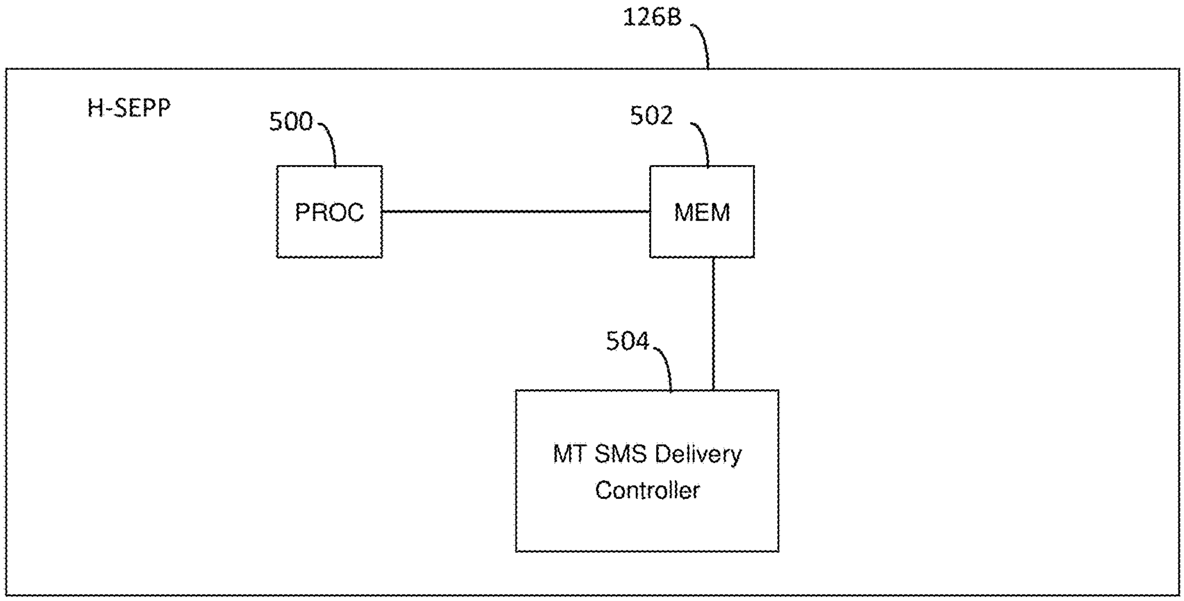
FIG. 5 is a block diagram of a SEPP suitable for initiating mobile terminated SMS messages to outbound roaming subscribers.

FIG. 5 is a block diagram of H-SEPP 126B suitable for initiating mobile terminated SMS messages to outbound roaming subscribers. Referring to FIG. 5, H-SEPP 126B includes at least one processor 500 and memory 502. H-SEPP 126B also includes an MT SMS delivery controller 504 for performing the steps described herein for generating and sending mobile-terminated SMS messages to UEs. MT SMS delivery controller 504 may be implemented using computer executable instructions stored in memory 502 and executed by processor 500.

Figure 6:
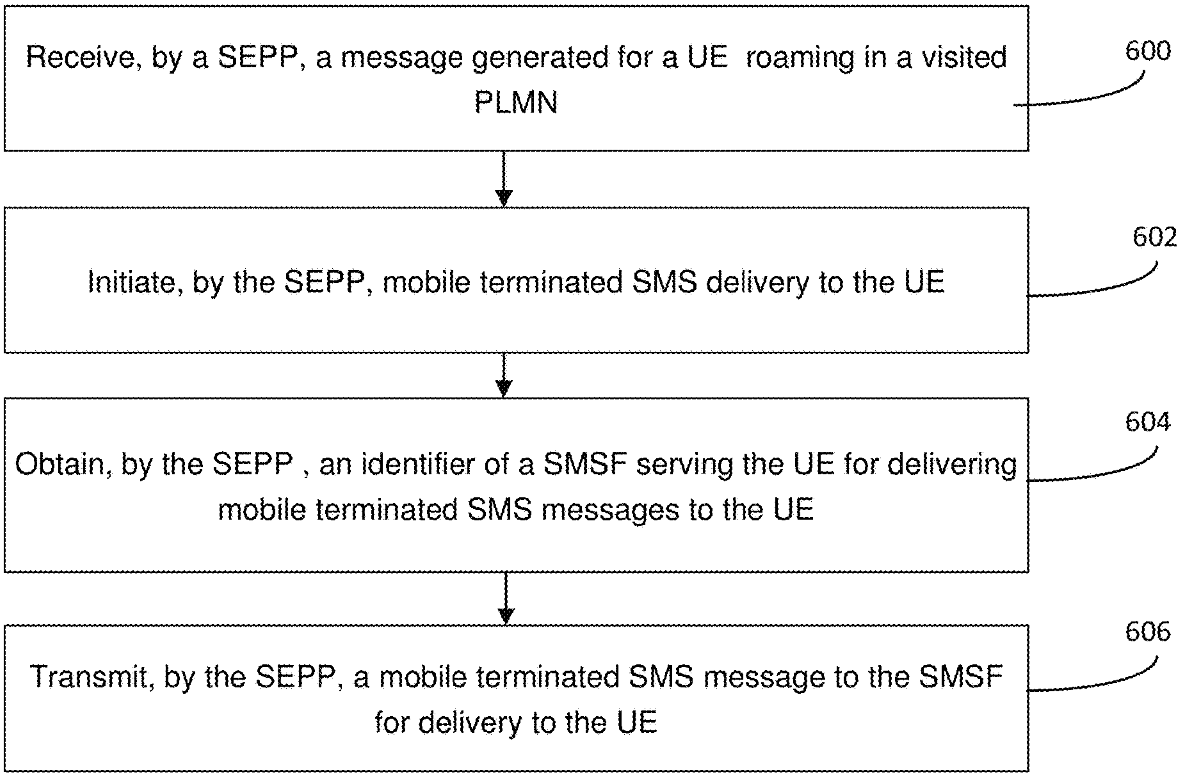
FIG. 6 is a flow chart illustrating an exemplary process for using a SEPP to initiate delivery of mobile terminated SMS messages to outbound roaming subscribers.

FIG. 6 is a flow chart illustrating an exemplary process for using a SEPP to initiate delivery of mobile terminated SMS messages to outbound roaming subscribers. Referring to FIG. 6, in step 600, the process includes receiving, by a SEPP, a message generated for a UE roaming in a visited PLMN. For example, a SEPP, such as H-SEPP 126B, may receive an Nudm_UECM_Registration request message for registering the serving AMF of a UE in a VPLMN.

In step 602, the process further includes initiating, by the SEPP, mobile terminated SMS delivery to the UE. For example, a SEPP, such as SEPP 126B, may initiate the process of delivering an SMS message, such as a welcome SMS message, to a UE in response to receiving an initial or subsequent registration message for the UE.

In step 604, the process further includes obtaining, by the SEPP, an identifier of an SMSF serving the UE for delivering mobile terminated SMS messages to the UE. For example, a SEPP, such as SEPP 126B, may generate and send an Nudm_UECM_SendRoutingInfoForSM request message to the UDM serving the UE. The SEPP may receive an Nudm_UECM_SendRoutingInfoForSM message including identifiers of SMSFs capable of delivering MT SMS messages to the UE via the AMF or other node serving the UE.

In step 606, the process further includes transmitting, by the SEPP, a mobile terminated SMS message to the SMSF for delivery to the UE. For example, a SEPP, such as SEPP 126B, may generate and send an NsmsfSMService_MTForwardSm request message including network-operator-specified content, such as a welcome message identifying the network in which the UE is roaming, to the SMSF serving the UE. The SMS content may also include charging information for the visited PLMN, such as roaming data rate, information about the amount of data remaining in the subscriber's data plan, etc.

Exemplary advantages of the subject matter described herein include avoiding the need for an SMS RVAS provider or a roaming hub provider separate from the H-SEPP to provide SMS RVAS to outbound roaming subscribers. The subject matter described herein enables an SMS RVAS implementation that maintains end-to-end confidentiality and integration over the N32-f interface between the V-PLMN and H-PLMN (i.e., no interception of inter-PLMN messages is required at roaming hub/IPX providers to implement the SMS roaming value added services described herein.

The subject matter described herein can be extended to additional use cases of MT SMS-based RVAS. For example, an H-SEPP as described herein may send MT SMS messages to outbound roaming subscribers not only upon receiving an initial registration of a UE, but also at any other time that the UE is roaming in a V-PLMN. Because the H-SEPP receives roaming registration messages any time the UE changes locations in the V-PLMN, the H-SEPP can use the procedure described above with regard to FIGS. 3 and 4 to identify the SMSF serving the subscriber and initiate a mobile terminated SMS message to the subscriber via the identified SMSF. The SMS messages may include any content selected by the network operator or sending party. For example, the SMS messages may include updated information about data usage, advertisements, opportunities to purchase additional data for roaming, etc.

The disclosure of each of the following references is hereby incorporated herein by reference in its entirety.

REFERENCES 1. 3rd Generation Partnership Project; Technical Specification Group Core Network and Terminals; 5G System; Network Function Repository Services; Stage 3 (Release 18) 3GPP TS 29.510 V18.7.0 (2024-06)
2. 3rd Generation Partnership Project; Technical Specification Group Services and System Aspects; Security architecture and procedures for the 5G System (5GS); (Release 18) 3GPP TS 33.501 V18.5.0 (2024-03)
3. 3rd Generation Partnership Project; Technical Specification Group Services and System Aspects; Procedures for the 5G System (5GS); (Release 19) 3GPP TS 23.502 V19.0.0 (2024-06)

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for using a security edge protection proxy (SEPP) for providing mobile terminated (MT) short message service (SMS) to outbound roaming subscribers, the method comprising:

receiving, by a SEPP, a message generated for a UE roaming in a visited public land mobile network (PLMN);

initiating, by the SEPP, MT SMS delivery to the UE, wherein initiating the MT SMS delivery includes:

obtaining, by the SEPP, an identifier of a short message service function (SMSF) serving the UE for delivering mobile terminated SMS messages to the UE; and transmitting, by the SEPP, a mobile terminated SMS message to the SMSF for delivery to the UE.

2. The method of claim 1 wherein receiving the message includes receiving an Nudm_UECM_Registration message for registering a serving network function (NF) serving the UE in the visited PLMN.

3. The method of claim 1 wherein obtaining an identifier of an SMSF serving the UE includes sending, by the SEPP, an Nudm_UECM_SendRoutingInfoForSM request message to a unified data management function (UDM) in a home network of the UE.

4. The method of claim 3 wherein obtaining the identifier of the SMSF serving the UE includes receiving an Nudm_UECM_SendRoutingInfoForSM response message from the UDM and reading the identifier of the SMSF from the Nudm_UECM_SendRoutingInfoForSM response message.

5. The method of claim 1 wherein transmitting the mobile terminated SMS message to the SMSF includes transmitting, by the SEPP, an Nsmsf SMService MtFowardSm message with an SMS payload to the SMSF.

6. The method of claim 5 wherein the SMS payload includes network-operator-specified content.

7. The method of claim 6 wherein the message generated for the UE roaming in the visited PLMN is a message for initially registering the UE with the visited PLMN wherein network-operator-specified content comprises a welcome message.

8. The method of claim 6 wherein the network-operator-specified content indicates data usage by the UE.

9. The method of claim 6 wherein the network-operator-specified content comprises an advertisement.

10. The method of claim 1 wherein the SEPP comprises a home SEPP (H-SEPP).

11. A system for using a security edge protection proxy (SEPP) for providing mobile terminated (MT) short message service (SMS) to outbound roaming subscribers, the system comprising:

a SEPP including at least one processor and a memory; and an MT SMS delivery controller implemented by the at least one processor for receiving a message generated for a UE roaming in a visited public land mobile network (PLMN), initiating MT SMS delivery to the UE, wherein initiating the MT SMS delivery includes:

obtaining, by the SEPP, an identifier of a short message service function (SMSF) serving the UE for delivering mobile terminated SMS messages to the UE; and transmitting, by the SEPP, a mobile terminated SMS message to the SMSF for delivery to the UE.

12. The system of claim 11 wherein the message includes an Nudm_UECM_Registration message for registering a serving network function (NF) serving the UE in the visited PLMN.

13. The system of claim 11 wherein the MT SMS delivery controller is configured to obtain the identifier of the SMSF serving the UE by sending an Nudm_UECM_SendRoutingInfoForSM request message to a unified data management function (UDM) in a home network of the UE.

14. The system of claim 13 wherein the MT SMS delivery controller is configured to obtain the identifier of the SMSF serving the UE by receiving an Nudm_UECM_SendRoutingInfoForSM response message from the UDM and reading the identifier of the SMSF from the Nudm_UECM_SendRoutingInfoForSM response message.

15. The system of claim 11 wherein the MT SMS delivery controller is configured to transmit the mobile terminated SMS message to the SMSF by transmitting an Nsmsf SMService MtFowardSm message with an SMS payload to the SMSF.

16. The system of claim 15 wherein the SMS payload includes network-operator-specified content.

17. The system of claim 16 wherein the message generated for the UE roaming in the visited PLMN is a message for initially registering the UE with the visited PLMN and the network-operator-specified content comprises a welcome message.

18. The system of claim 16 wherein the network-operator-specified content indicates data usage by the UE or an advertisement.

19. The system of claim 11 wherein the SEPP comprises a home SEPP (H-SEPP).

20. A non-transitory computer readable medium having stored thereon executable instructions that when executed by a processor of a computer control the computer to perform steps comprising:

receiving, by a security edge protection proxy (SEPP), a message generated for a UE roaming in a visited public land mobile network (PLMN);

initiating, by the SEPP, mobile terminated (MT) short message service (SMS) delivery to the UE, wherein initiating the MT SMS delivery includes:

obtaining, by the SEPP, an identifier of a short message service function (SMSF) serving the UE for delivering mobile terminated SMS messages to the UE; and transmitting, by the SEPP, a mobile terminated SMS message to the SMSF for delivery to the UE.

* * * * *